United States Patent
Stolitzka et al.

(10) Patent No.: US 9,489,331 B2
(45) Date of Patent: Nov. 8, 2016

(54) METHOD AND PROTOCOL FOR HIGH-SPEED DATA CHANNEL DETECTION CONTROL

(71) Applicant: SAMSUNG DISPLAY CO., LTD., Yongin, Gyeonggi-Do (KR)

(72) Inventors: Dale Stolitzka, Los Altos, CA (US); Wei Xiong, Mountain View, CA (US)

(73) Assignee: Samsung Display Co., Ltd., Yongin (KR)

( * ) Notice: Subject to any disclaimer, the term of this patent is extended or adjusted under 35 U.S.C. 154(b) by 592 days.

(21) Appl. No.: 13/953,630

(22) Filed: Jul. 29, 2013

(65) Prior Publication Data

US 2014/0101357 A1 Apr. 10, 2014

Related U.S. Application Data

(60) Provisional application No. 61/712,228, filed on Oct. 10, 2012.

(51) Int. Cl.
| | |
|---|---|
| *G06F 13/40* | (2006.01) |
| *G06F 13/42* | (2006.01) |
| *G09G 5/00* | (2006.01) |
| *G06F 3/14* | (2006.01) |

(52) U.S. Cl.
CPC ....... *G06F 13/4022* (2013.01); *G06F 13/4295* (2013.01); *G09G 5/006* (2013.01); *G06F 3/1431* (2013.01); *G09G 2330/06* (2013.01); *G09G 2340/02* (2013.01); *G09G 2350/00* (2013.01); *G09G 2352/00* (2013.01); *G09G 2370/045* (2013.01); *G09G 2370/10* (2013.01)

(58) Field of Classification Search
CPC .................................. G06F 13/4022
USPC .............................. 710/105, 106
See application file for complete search history.

(56) References Cited

U.S. PATENT DOCUMENTS

| | | | | |
|---|---|---|---|---|
| 7,539,812 | B2* | 5/2009 | Tetrick | G06F 13/1605 711/105 |
| 2005/0164664 | A1* | 7/2005 | DiFonzo | H04L 45/00 455/277.1 |
| 2007/0055759 | A1 | 3/2007 | McCoy et al. | |
| 2008/0172501 | A1* | 7/2008 | Goodart | G06F 13/40 710/33 |
| 2011/0149796 | A1* | 6/2011 | Qu | G06F 3/14 370/254 |

FOREIGN PATENT DOCUMENTS

KR 2007-0026471 3/2007

OTHER PUBLICATIONS

VESA DisplayPort Standard, Version 1, Revision 1a; Video Electronics Standards Association; pp. 1-11,14,29-35,88-100 and 116-119; Jan. 11, 2008.*

* cited by examiner

*Primary Examiner* — Glenn A Auve
(74) *Attorney, Agent, or Firm* — Lewis Roca Rothgerber Christie LLP

(57) ABSTRACT

A system capable of bi-directional data transfer, the system including a host configured to send downstream data to a peripheral and to receive upstream data from the peripheral, a main link coupled to the host and configured to transfer the downstream data from the host to the peripheral, and an auxiliary link coupled to the host and including a first auxiliary link lane for transferring the upstream data from the peripheral to the host in a first mode, and for transferring the downstream data from the host to the peripheral in a second mode, wherein the host is configured to engage in one or more handshake processes with the peripheral to cause the auxiliary link to switch between the first and second modes.

16 Claims, 7 Drawing Sheets

METHOD AND PROTOCOL FOR HIGH-SPEED DATA CHANNEL DETECTION CONTROL

CROSS-REFERENCE TO RELATED PATENT APPLICATION

This application claims priority to and the benefit of U.S. Provisional Application No. 61/712,228 filed Oct. 10, 2012, the entire content of which is incorporated by reference herein.

BACKGROUND

1. Field

Embodiments of the present invention relate to a method and protocol for high-speed data channel direction control.

2. Description of the Related Art

Previously, sideband or auxiliary lanes (e.g., wire pairs, wherein one lane is a pair of differential wires) transported low-speed data on a bi-directional link.

An example is the MIPI DSI v1.1 display interface. This display interface permits one lane of four (e.g., lane 0 of lanes 0-3) to reverse direction from normally high-speed downstream into low-speed upstream. Accordingly, one high-speed lane may be "turned around," or "reversed," enabling the lane to switch from operating in high-speed downstream to operating in half-duplex, or low-speed, upstream. However, the MIPI DSI display interface is not capable of increasing downstream bandwidth, and is also not capable of providing data in the "reversed" upstream direction at high-speed.

For example, when the MIPI DSI display interface causes the data transmission along one of the lanes to switch directions, the link is turned off, and a character is sent to explain that the host, or transmitter (e.g., the device sending downstream data) is turning control over to the peripheral, or receiver, to thereby initiate the drivers of the receiver. This causes the high-speed downstream to power down, and the low-speed upstream to power up.

As video display resolution and frame rates increase (for example, the display resolution for televisions is expected to increase from 1920×1080 (2 Mpixels) to 7680×4320 (32 Mpixels) by 2016, while the display resolution for tablet computers is expected to increase from 1200×800 (1 Mpixels) to 2560×1600 (4 Mpixels) by 2014), lanes that carry pixel data to the corresponding display will need to have an increasing amount of bandwidth to carry an increasing amount of pixel data to allow the display to have operate with the increased resolution.

However, the data rates of the physical layer are generally not increasing at the same rate at which the data will need to be transmitted in accordance with increased display resolution. Accordingly, many display interfaces will compress the display stream data to compensate for a lack of available bandwidth on the physical layer, thereby reducing the amount of data that will be sent.

With respect to compression of the display stream, data compression can be lossless, which is ideal, or lossy, wherein some integrity of the image quality is lost during transmission. Certain types of data may be difficult to compress in a lossless manner. Further, lossy compression can result in visual artifacts that can be noticed by the user, thereby reducing the quality of images displayed.

Accordingly, by increasing link bandwidth, the amount of necessary compression can be reduced. Therefore, images transmitted across a link having increased bandwidth may be transmitted using a higher quality lossy compression, or may even be transmitted using lossless compression.

SUMMARY

Embodiments of the present invention define a new and unique method and protocol to switch data flow direction for auxiliary link lanes between a host and a peripheral.

Occasionally, additional data capacity may be desirable when transporting compressed video or still images that are harder to compress (e.g., harder to be represented by a relatively small compressed file). Images generally change between scenes of a video stream, and the ability to add, or increase, data capacity in real time is a currently sought after advance.

Accordingly, embodiments of the present invention improve transmitted image quality for compressed images that are transmitted over embedded or external display interfaces with a fixed cable. The image quality will increase when the high-speed auxiliary lane is reversed to convey image data for content that is difficult to compress.

Embodiments of the present invention provide a method and a protocol that manage the switching of a normally upstream (e.g., peripheral-to-host direction) lane(s) used as auxiliary lane(s) into a downstream (e.g., host-to-peripheral direction) lane(s) in addition to the normally downstream lanes of the main link, thereby allowing for increased data capacity. Accordingly, embodiments of the present invention can use all available lanes in a host-peripheral link, including auxiliary lanes, for delivering data from the host to peripheral devices.

According to an embodiment of the present invention, there is provided a system capable of bi-directional data transfer, the system including a host configured to send downstream data to a peripheral and to receive upstream data from the peripheral, a main link coupled to the host and configured to transfer the downstream data from the host to the peripheral, and an auxiliary link coupled to the host and including a first auxiliary link lane for transferring the upstream data from the peripheral to the host in a first mode, and for transferring the downstream data from the host to the peripheral in a second mode, wherein the host is configured to engage in one or more handshake processes with the peripheral to cause the auxiliary link to switch between the first and second modes.

The main link may include d main link lanes, and the auxiliary link may include u auxiliary link lanes including the first auxiliary link lane, wherein d and u are natural numbers.

Between 1 and u of the auxiliary link lanes may be used for transferring the downstream data from the host to the peripheral during the second mode, and between 0 and (u−1) auxiliary link lanes may be used for transferring the upstream data from the peripheral to the host during the second mode.

The host may include a graphics processor, and the peripheral may include a display device.

The host may be configured to send a first bus turn-around sequence (BTS) flag to the peripheral via one or more main link lanes of the main link during the handshake process for switching from the first mode to the second mode, and the host may be configured to receive a first acknowledge sequence (ACKS) flag from the peripheral via one or more auxiliary link lanes including the first auxiliary link lane during the handshake process for switching from the first mode to the second mode.

The peripheral may be configured to receive and detect the first BTS flag before sending the first ACKS flag terminate transfer of the upstream data on the first auxiliary link lane, and deactivate a peripheral transmission driver corresponding to the first auxiliary link lane during the handshake process for switching from the first mode to the second mode, and the host may be configured to receive the first ACKS flag, wait for an amount of time to ensure the peripheral transmission driver corresponding to the first auxiliary link lane is deactivated, enable a host transmission driver corresponding to the first auxiliary link lane, and send the downstream data to the peripheral on the first auxiliary link lane during the handshake process for switching from the first mode to the second mode.

When all auxiliary link lanes of the auxiliary link are in a downstream mode for sending the downstream data from the host to the peripheral in the second mode, the host may be configured to send a first BTS flag, disable a host transmission driver corresponding to the auxiliary link, send a second BTS flag, and enable a peripheral transmission driver corresponding to the first auxiliary link lane during the handshake process for switching from the first mode to the second mode.

The host may be configured to send fill characters in one or more of main link lanes of the main link after sending the first BTS flag during the handshake process for switching from the first mode to the second mode.

The peripheral may be configured to receive the second BTS flag before enabling the peripheral transmission driver corresponding to the first auxiliary link lane, and to send an ACKS flag on the auxiliary link to the host during the handshake process for switching from the first mode to the second mode.

When a second auxiliary link lane of the auxiliary link is configured to send the upstream data from the peripheral to the host in the second mode the host may be configured to send a first bus turnaround sequence (BTS) flag to the peripheral, the peripheral may be configured to receive and detect the first BTS flag, and to send a first acknowledge sequence (ACKS) flag to the host on the second auxiliary link lane, the host may be configured to receive and detect the first ACKS flag, to disable a host transmission driver corresponding to the first auxiliary link lane, and to send a second BTS flag to the peripheral on one or more main link lanes of the main link, the peripheral may be configured to receive and detect the second BTS flag, to enable a peripheral transmission driver corresponding to the first auxiliary link lane, and to send a second ACKS flag to the host, and the host may be configured to receive and detect the second ACKS flag during the handshake process for switching from the second mode to the first mode.

When a second auxiliary link lane of the auxiliary link is configured to send the upstream data from the peripheral to the host in the second mode, the host may be configured to send a first bus turnaround sequence (BTS) flag to the peripheral, wait an amount of time to receive a first ACKS flag, which corresponds to the first BTS flag, from the peripheral, and resend a first BTS flag on only one or more main link lanes of the main link if no ACKS flag is detected by the host, during the handshake process for switching from the second mode to the first mode.

When a second auxiliary link lane of the auxiliary link is configured to send the upstream data from the peripheral to the host in the second mode, the host may be configured to send a first bus turnaround sequence (BTS) flag to the peripheral, the peripheral may be configured to receive and detect the first BTS flag, and to send a first acknowledge sequence (ACKS) flag to the host on the second auxiliary link lane, and the host may be configured to receive and detect the first ACKS flag, to disable a host transmission driver corresponding to the first auxiliary link lane, to send a second BTS flag to the peripheral on one or more main link lanes of the main link, to wait an amount of time to receive a second ACKS flag, which corresponds to the second BTS flag, from the peripheral, and to resend a second BTS flag on only one or more main link lanes of the main link if no second ACKS flag is detected by the host, during the handshake process for switching from the second mode to the first mode.

The auxiliary link may include a second auxiliary link lane for transferring the upstream data from the peripheral to the host in an upstream mode of the second mode, or for transferring the downstream data from the host to the peripheral in a downstream mode of the second mode, and the host and the peripheral may be configured to switch the second auxiliary link lane from the downstream mode to the upstream mode when, a host link manager of the host determines that there is sufficient downstream bandwidth to send the downstream data from the host to the peripheral without sending the downstream data on the second auxiliary link lane, or when the host link manager grants a request from the peripheral for an additional auxiliary link lane for the upstream data.

According to another embodiment of the present invention, there is provided a system capable of bi-directional data transfer, the system includes a host including a host transmission driver for sending downstream data to a peripheral, the host being configured to receive upstream data from the peripheral according to an operation of a peripheral transmission driver, a main link coupled to the host for transferring the downstream data, an auxiliary link coupled to the host for transferring the upstream data in a first mode and for transferring the downstream data in a second mode, a processor, and memory, wherein the memory has stored thereon instructions that, when executed by the processor, causes the processor to switch the auxiliary link from the first mode to the second mode, or to switch the system from the second mode to the first mode, wherein the instructions for switching from the first mode to the second mode include a protocol for sending a bus turn-around sequence (BTS) flag from the host to the peripheral, sending an acknowledge sequence (ACKS) flag from the peripheral to the host upon the host detecting the BTS flag, deactivating the peripheral transmission driver, and activating the host transmission driver corresponding to the auxiliary link to enable the host to send the downstream data on the auxiliary link.

The instructions may cause the system to switch from the first mode to the second mode when bandwidth of the main link is insufficient to send the downstream data from the host to the peripheral.

The instructions may cause the system to switch from the second mode to the first mode when the upstream data from the peripheral to the host is pending, or when the system determines that the main link can provide sufficient bandwidth to send the downstream data without sending the downstream data on the auxiliary link.

According to another embodiment of the present invention, there is provided a system capable of bi-directional data transfer, the system includes a host including a host transmission driver, and configured to send downstream data from the host to a peripheral, and to receive upstream data from the peripheral according to a peripheral transmission driver, a main link coupled to the host for transferring the downstream data, and an auxiliary link coupled to the host for transferring the upstream data in a first mode and for transferring the downstream data in a second mode, wherein, when switching from the first mode to the second mode, the host is configured to send a first bus turn-around sequence (BTS) flag to the peripheral via the main link, wherein, upon receiving and detecting the first BTS flag, the peripheral is configured to send a first acknowledge sequence (ACKS) flag via the auxiliary link to the host, and is configured to deactivate the peripheral transmission driver, and wherein the host is configured to activate the host transmission driver to enable the auxiliary link to transfer the downstream data in the second mode.

Accordingly, embodiments of the present invention may be applied in embedded display panels for lowering lane count, lowering pin count, and lowering manufacturing cost, while still providing sufficient bandwidth for delivery of the image information to be displayed on the display panel. Other embodiments may include one or more of display modules, mobile phones, tablets, computer monitors, set-top box players, home theater systems, televisions that contain a high-speed auxiliary lane, and any other suitable display and/or smart devices.

BRIEF DESCRIPTION OF THE DRAWINGS

The above and other aspects of embodiments of the present invention will become more apparent by describing in detail exemplary embodiments thereof with reference to the attached drawings, in which.

DETAILED DESCRIPTION

Figure 1:
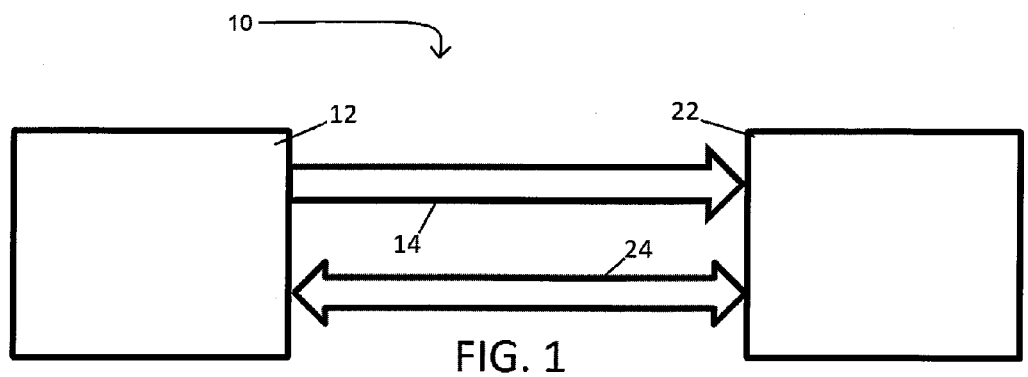
FIG. 1 is a block diagram depicting a unidirectional main link and a bidirectional auxiliary link between a host and a peripheral, according to an embodiment of the present invention.

While exemplary embodiments of the present invention are susceptible to various modifications and alternative forms, specific embodiments are shown by way of example in the drawings, and will herein be described in detail. It should be understood, however, that there is no intent to limit exemplary embodiments of the invention to the particular forms disclosed, but conversely, exemplary embodiments of the invention are to cover all modifications, equivalents, and alternatives falling within the spirit and scope of the invention. In the following description of the present invention, a detailed description of known functions and configurations incorporated herein will be omitted when it may make the subject matter of the present invention less clear.

It will be understood that, although the terms first, second, etc. may be used herein to describe various elements, these elements should not be limited by the strict construction of these terms. These terms are only used to distinguish one element from another.

The terminology used herein is for the purpose of describing particular embodiments only, and is not intended to be limiting of the present invention. As used herein, the singular forms "a," "an," and "the" are intended to include the plural forms as well as the singular, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Hereinafter, embodiments of the present invention will be described in detail by explaining exemplary embodiments of the invention with reference to the attached drawings. Like reference numerals in the drawings denote like elements, and repeated descriptions thereof may be omitted.

FIG. 1 is a block diagram depicting a unidirectional main link 14 and a bidirectional auxiliary link 24 between a host device (host) 12 and a peripheral device (peripheral) 22, according to an embodiment of the present invention. Referring to FIG. 1, an embodiment of the present invention may include a bidirectional data transfer system (system) 10 containing a host graphics processor (e.g., a graphics processing unit, or a "GPU") 12 that has a unidirectional main link 14 having d main link lanes 16 (wherein d is a real number) connected to a peripheral 22 having a bidirectional auxiliary link 24 having u auxiliary link lanes 26 (wherein u is a real number).

In the present embodiment, downstream data is delivered from the host (e.g., the graphics processor) 12 to the peripheral (e.g., a display device) 22 and may include real-time streaming video having high priority. Accordingly, if the video data is not delivered from the host 12 to the peripheral 22, a user may see lost, compromised, or frozen video.

Upstream data delivered from the peripheral 22 to the host 12 on the auxiliary link 24 may be "bursty," meaning that the upstream data may sometimes be streamed in real-time, but may have a lower priority than the downstream data. Accordingly, if bandwidth is limited, and if a conflict between the downstream data and the upstream data occurs, the downstream data may take priority over the upstream data, which may cause the delivery of the upstream data to be buffered or discarded.

The auxiliary link lanes 26 of the present embodiment are capable of having the same data rate as the main link lanes 16, and may be capable of having the same data rate regardless of the direction of data flow. Accordingly, the data rate of the bidirectional auxiliary link lanes 26 may be the same in either direction, whether upstream (peripheral-to-host) or downstream (host-to-peripheral).

The total potential available bandwidth downstream (e.g., the bandwidth available when all lanes 26 of the auxiliary link 24 are operated in a downstream mode) is equal to the average bandwidth of each of the lanes 16, 26 multiplied by the total number of lanes 16, 26, which is the sum of the number of the auxiliary link lanes 26 and the number of the main link lanes 16. Accordingly, if "B" is the bandwidth of a single lane, wherein each lane has a bandwidth of "B," or if "B" is the average bandwidth of each lane, then the potential available bandwidth downstream is equal to (d+u)×B (e.g., the available bandwidth when no upstream communication occurs), while the potential available bandwidth upstream is equal to u×B (e.g., when each of the bidirectional auxiliary link lanes 26 is operating in an upstream mode, and when no downstream data is present on the auxiliary link 24). Accordingly, the potential available bandwidth downstream is higher than the potential available bandwidth upstream, as the main link 14 is unidirectional, and is dedicated to downstream data communication.

In the present embodiment, when the system 10 operates in a first mode (e.g., Mode 1), d main link lanes 16 are allocated for downstream data transfer, while all of the u auxiliary link lanes 26 are allocated for upstream data transfer.

In a second mode (e.g., Mode 2), anywhere from (d+1) to (d+u) auxiliary link lanes 26 and main link lanes 16 may be used for downstream data transfer, while (u−1) auxiliary link lanes 26 or fewer remain for upstream data transfer. In other words, in the second mode, (d+x) lanes 16 and 26 may be used for downstream data transfer, while (u−x) auxiliary link lanes 26 may be used for upstream data transfer, where x is a real number that is less than u (x</=u).

According to an embodiment of the present invention, the host 12 may determine (e.g., by using a decision tree or other protocol, which may correspond to instructions stored in a computer memory and carried out by a processor, such as a main link manager 17, as will be known to one of ordinary skill in the art) when and how many auxiliary link lanes 26 to switch for Mode 2 operation (e.g., what number to set as "x" in the example provided above).

Figure 2A:
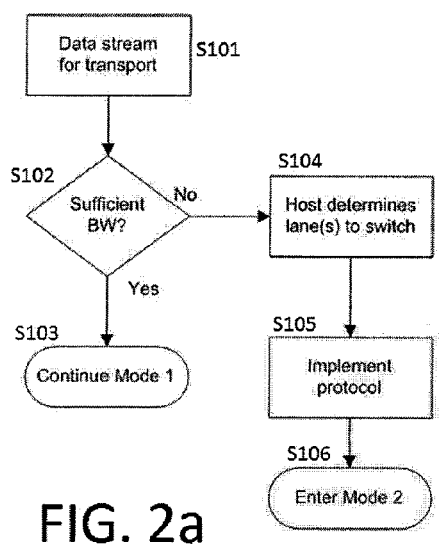
FIGS. 2a and 2b are flow diagrams that depict protocols of a system of an embodiment of the present invention for respectively determining whether to switch from a first mode to a second mode, or whether to modify a second mode/switch from a second mode to a first mode.
Figure 2B:
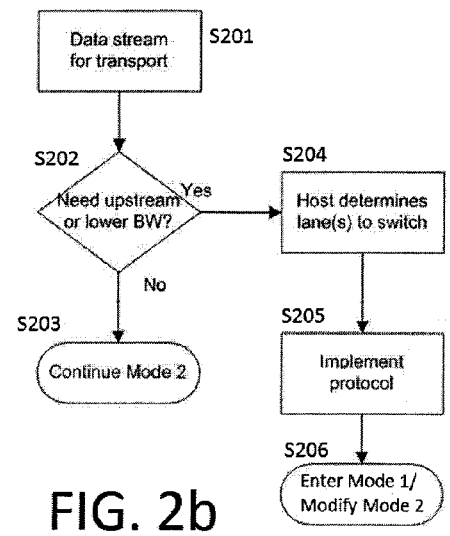

FIGS. 2a and 2b are flow diagrams that depict protocols of a system of an embodiment of the present invention for respectively determining whether to switch from a first mode to a second mode, or whether to modify a second mode/switch from a second mode to a first mode. Referring to FIGS. 2a and 2b, decision trees/flow charts that may be used by the host graphics processor 12 (e.g., the processor/main link manager 17) to determine which of Modes 1 and 2 to operate in, and whether to initiate a protocol to switch between Modes 1 and 2 (or modify the Mode 2) are illustrated.

In the present embodiment, and referring to FIG. 2a, when the host 12 is operating in Mode 1, once the data stream (e.g., data stream 6 of FIG. 3a and 3b, or Bytes 0-5 of FIGS. 4a and 4b) is provided to the host 12 to be transported to the peripheral 22, as shown in step S101, the host 12 is able to analyze the characteristics of the data stream, and is able to determine in step S102 whether extra bandwidth is desired for downstream data transfer. If the bandwidth (e.g., the bandwidth of the main link 14) is such that the downstream data stream is able to be satisfactorily transferred from the host 12 to the peripheral 22, the system 10 will continue to operate in Mode 1, as shown in step S103. However, if it is determined in step S102 (e.g., if it is determined by the main link manager 17) that the bandwidth of the main link 14 is insufficient to satisfactorily deliver the data contained in the data stream to the peripheral 22, then the host 12 determines which of the bidirectional auxiliary link lane(s) 26 to switch from an upstream direction to a downstream direction, as shown in step S104. Then, in step S105, the host 12 implements the protocol for switching the direction of the bidirectional auxiliary link lane(s) 26 to a downstream direction (which will be described further below with respect to FIG. 5). Once the protocol is completed, the system 10 operates in Mode 2 to have an increased downstream bandwidth, as shown in step S106.

Referring to FIG. 2b, when the host 12 is operating in Mode 2, once the data stream is provided to the host 12 to be transported to the peripheral 22, as shown in step S201, the host 12 is able to analyze the characteristics of the data stream. Then, in step S202, the link manager 17 may determine whether upstream traffic is desired (e.g., when all of the auxiliary link lanes 26 are operated in a downstream mode, the host 12 may determine whether to switch one of the auxiliary link lanes 26 into normal/upstream mode), may determine whether additional upstream traffic is desired (e.g., when one or more, but less than all, of the auxiliary link lanes 26 is operating in an upstream mode, the host 12 may determine whether to switch additional auxiliary link lanes 26 into upstream mode), and/or may determine whether lower bandwidth for downstream traffic on the lanes 16 and 26 operating in the downstream mode would suffice for the downstream data stream (e.g., whether lower downstream bandwidth would suffice for the parameters of the system/data).

If additional upstream traffic is not desired, and/or lowering the bandwidth for the downstream traffic would result in an insufficient downstream data stream, then the host 12 will continue to operate in Mode 2, as shown in step S203. However, if additional upstream traffic is desired and/or lower downstream bandwidth will still allow the data stream to be satisfactorily transported to the peripheral 22, the host 12 determines which auxiliary lane(s) 26 to switch to be in an upstream mode, as shown in step S204.

Then, the system 10 implements a protocol for either switching from Mode 2 to Mode 1 (which will be discussed further below with respect to FIG. 6), or modifying the lanes 26 operated in Mode 2 to remain in Mode 2 while using fewer auxiliary link lanes 26 in the downstream mode, as shown in step S205. Then, in step S206, the system 10 may either operate in Mode 1 or in a modified version of Mode 2.

Figure 3A:
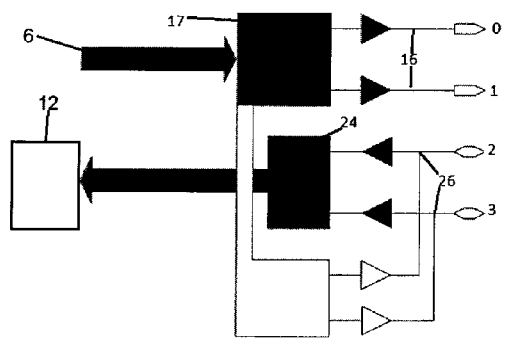
FIGS. 3a and 3b are block diagrams depicting the bidirectional auxiliary link switching from upstream in FIG. 3a to downstream in FIG. 3b according to an embodiment of the present invention.
Figure 3B:
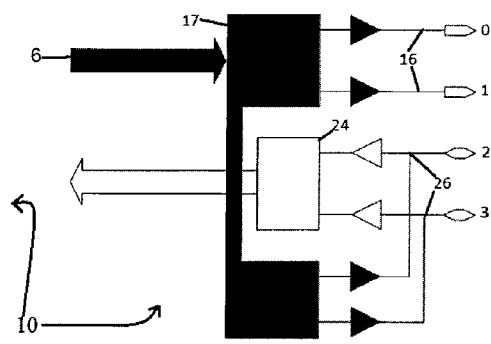

FIGS. 3a and 3b are block diagrams depicting the bidirectional auxiliary link switching from upstream in FIG. 3a to downstream in FIG. 3b according to an embodiment of the present invention. Referring to FIGS. 3a and 3b, an embodiment of the present invention having a main link 14 with two main lanes (d=2) and an auxiliary link 24 with two auxiliary link lanes 26 (u=2) is shown, wherein Lanes 0 and 1 are the main link lanes 16, and Lanes 2 and 3 are the auxiliary link lanes 26.

In Mode 1, and as shown in FIG. 3a, Lane 0 and Lane 1, which are unidirectional main link lanes 16, are operated in a downstream mode, while Lane 2 and Lane 3 are operated in an upstream mode. However, in Mode 2 (as shown in FIG. 3b), all of Lanes 0-3 are used to deliver data downstream (from the host 12 to the peripheral 22). Accordingly, in Mode 2, the main link manager 17 distributes data across the available downstream lanes.

The main link manager 17 of the present embodiment distributes bytes across available downstream lanes 16/26 to reduce the average bandwidth used for each lane (e.g., to reduce the average number of bytes in each lane for a given data packet, or for a given data stream 6). The main link manager 17 may follow link layer rules that may be defined by the transport protocol, which determines how the bytes are sent from the host 12 to the peripheral 22 (e.g., the transport protocol may determine in which lanes particular bytes are sent, and in what order).

Furthermore, depending on the link implementation, some skew may be allowed across the lanes (e.g., Lanes 0-3). By introducing some skew, electromagnetic interference among the lanes may be reduced, as will be known to one of skill in the art. Accordingly, the abovementioned transport protocol of an embodiment of the present invention may set the skew to be greater than 0.

Figure 4A:
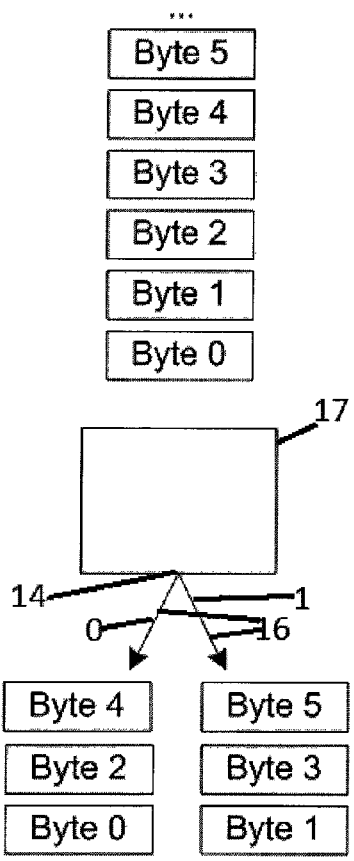
FIGS. 4a and 4b are block diagrams depicting the division of bytes among various lanes of a main link and/or an auxiliary link according to first and second modes according to an embodiment of the present invention.
Figure 4B:
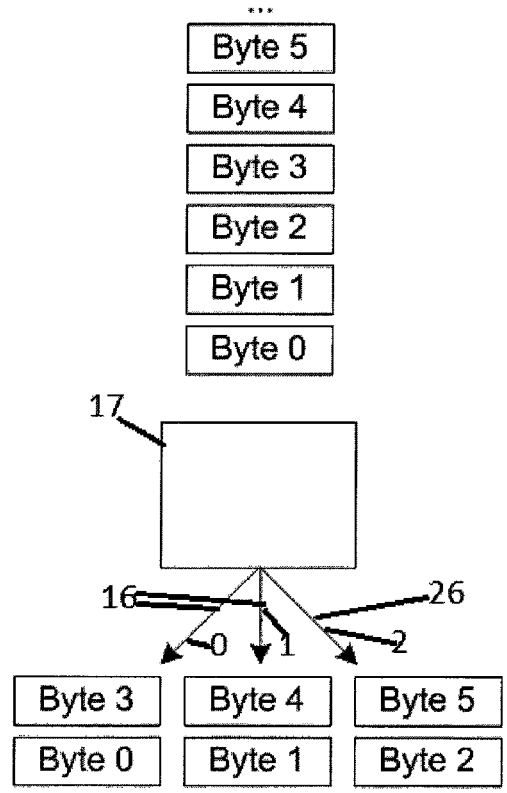

FIGS. 4a and 4b are block diagrams depicting the division of bytes among various lanes of a main link and/or an auxiliary link according to first and second modes according to an embodiment of the present invention. FIGS. 4a and 4b depict sending bytes from the host 12 to the peripheral 22 as determined by the main link manager 17 in first and second modes (e.g., Mode 1 and Mode 2), respectively. As an example, the distribution of the first 6 bytes of data is depicted in FIGS. 4a and 4b, which respectively show Byte 0 to Byte 5 distributed in Modes 1 and 2.

Referring to FIG. 4a, in Mode 1, Lane 0 and Lane 1 of the main link 14 are used for downstream data streaming, while Lane 2 and Lane 3 of the auxiliary link 24 are used for upstream data streaming. Referring to FIG. 4b, in Mode 2, Lanes 0 and 1 are used for downstream data streaming in addition to an additional lane (e.g., Lane 2, which is an auxiliary link lane 26). As can be seen by comparing FIGS. 4a and 4b, by using an auxiliary link lane 26 for downstream data streaming in addition to Lanes 0 and 1 of the main link 14, the available downstream bandwidth is increased.

Figure 5:
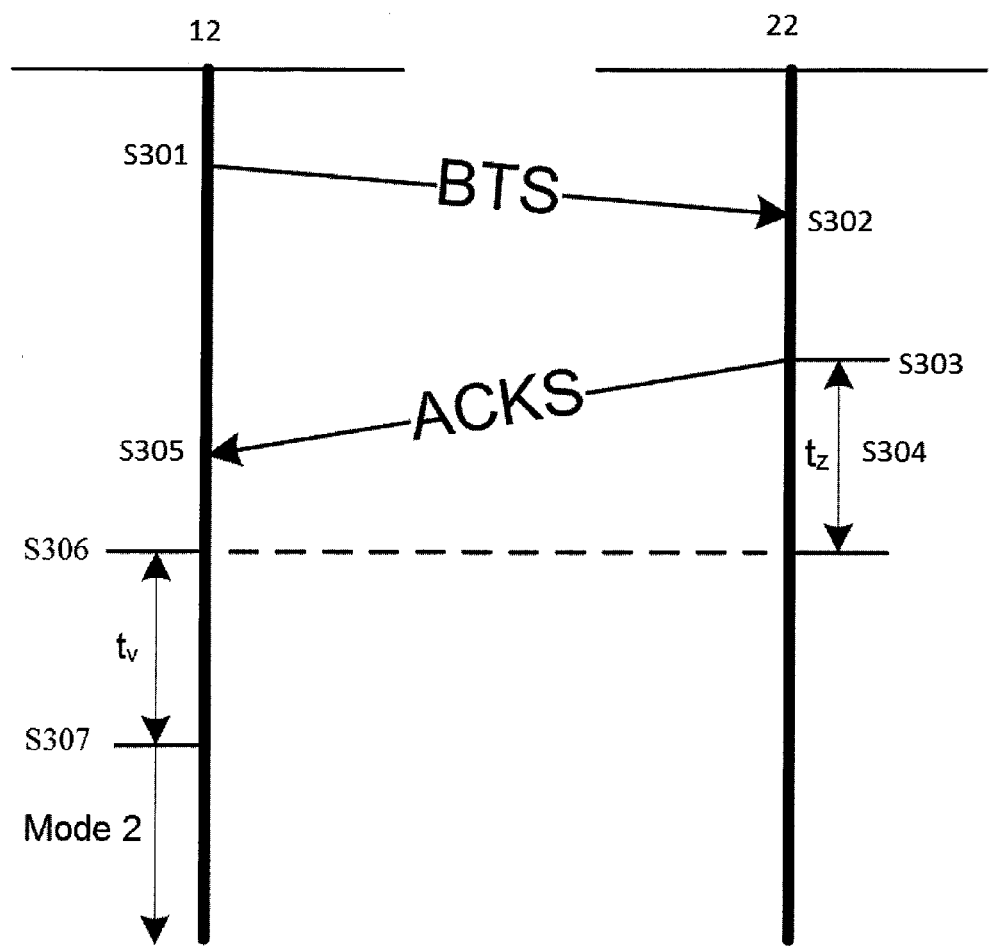
FIG. 5 is a timing diagram depicting a handshake protocol between a host and a peripheral when switching from a first mode to a second mode, according to an embodiment of the present invention.

FIG. 5 is a timing diagram depicting a handshake protocol between a host and a peripheral when switching from a first mode to a second mode, according to an embodiment of the present invention. The protocol for switching from Mode 1 to Mode 2 (e.g., S105 of FIG. 2a) is initiated when the main link manager 17 determines (e.g., if in step S102 of FIG. 2a) that there is insufficient bandwidth to transport the downstream data stream.

At step S301, the host 12, using one or more Host TX drivers (e.g., host trans mission drivers), sends a Bus Turnaround Sequence (BTS) flag to the peripheral 22 to begin the process of switching from normal operation (e.g., the first mode, or Mode 1) to a downstream priority operation (e.g., the second mode, or Mode 2), and to initiate reversal of one or more of the auxiliary link lanes 26 from an upstream mode to a downstream mode.

The BTS may include one or more control symbols, or may include one or more series of bytes. The BTS may be defined at the transport layer, and is sent by the host 12 to the peripheral 22 to initiate the switching from Mode 1 to Mode 2. The BTS may be sent on one or multiple downstream lanes 16 of the main link 14, as determined by the link layer protocol (e.g., the main link manager 17).

When the peripheral 22 receives the BTS from the host 12 at step S302, and recognizes/detects the BTS, the peripheral 22 terminates additional upstream data transfer on one or more auxiliary link lanes 26 of the auxiliary link 24, as may be determined by the link layer protocol.

Then, at step S303 the peripheral 22, by using one or more Peripheral TX drivers (e.g., peripheral transmission drivers, or auxiliary TX drivers), sends an Acknowledge Sequence (ACKS) flag to the host 12 in one or more upstream lanes 26 of the auxiliary link 24, as may be determined by the link layer protocol.

The ACKS may be one or more control symbols or series of bytes, which may be defined in the transport layer, and which are sent by the peripheral 22 to inform the host 12 that the peripheral 22 has acknowledged the BTS switch sequence (e.g., to indicate that the peripheral 22 has received the BTS), and that the peripheral 22 is ready for a new operation mode (e.g., Mode 2). When sending the ACKS, the peripheral may also send the final upstream data sequence to the host.

After the ACKS is sent by the peripheral 22 to the host 12 (in step S304) as a result of the BTS, the peripheral 22 disables one or more of the Peripheral TX drivers of the peripheral 22, which is the transmitter buffer driving signal on one of the auxiliary link lanes 26, thereby disabling the Peripheral TX drivers of one or more lanes 26 of the auxiliary link 24. The Peripheral TX drivers are used to send upstream data from the peripheral 22 to the host 12. Because the system 10 is switching one or more of the auxiliary link lanes 26 from upstream mode to downstream mode, those lanes 26 are no longer intended to send data from the peripheral 22 to the host 12 (until being switched back to upstream mode). Accordingly, the Peripheral TX driver(s) corresponding to the lane(s) switched downstream will not be needed during the operation in Mode 2.

Furthermore, upon deactivating one or more of the Peripheral TX drivers, one or more corresponding Peripheral RX drivers (e.g., peripheral receiving drivers) are activated to enable the peripheral 22 to receive data from the host 12 on the lane(s) 26 switched to downstream mode.

When sending the ACKS, the peripheral 22 may also manage pending upstream data. If no auxiliary link lanes 26 are available for upstream data communication, the upstream data may be buffered or lost. If one of the lanes 26 of the auxiliary link 24 is available for upstream data to be sent from the peripheral 22 to the host 12, there may still be insufficient upstream bandwidth/capacity to carry the pending upstream data, and some of the upstream data may be compromised. It should be noted that various policies may be implemented according to embodiments of the present invention, and the system 10 may, for example, allow the data to overflow. Furthermore, the peripheral 22 may send an interrupt request flag via one of the available upstream auxiliary link lanes 26 to request that the host 12 pause or disable the downstream data one or more of the auxiliary link lanes 26 to provide additional upstream bandwidth for the peripheral 22 to send data to the host 12 (e.g., in modifying the operation of Mode 2, as will be discussed further below with respect to FIG. 6).

Once the host 12 receives the ACKS in step S305, the host 12 waits for an amount of time $t_z$ (e.g., a peripheral TX driver turn-off time) after the ACKS is sent. In the present embodiment, the time $t_z$ is the maximum amount of time expected for the Peripheral TX to shut down (and therefore the amount of time it is expected for there to be no further data sent on the auxiliary lane(s) 26 corresponding to the deactivated Peripheral TX driver(s)).

After the time $t_z$, the host waits for a time $t_y$, which corresponds to a maximum amount of time expected for the host 12 to activate one or more Host TX drivers corresponding to the reversed auxiliary link lane(s) 26, the Host TX drivers enabling the host 12 to send downstream data to the peripheral 22. Because of the bidirectional nature of the auxiliary link 24, one or more Host TX drivers will correspond to ones of the auxiliary link lanes 26. Also, during the process of activating Host TX drivers, one or more corresponding Host RX drivers (e.g., host receive drivers) that are used to enable the host 12 to receive upstream data from the peripheral 22 may be deactivated, as the host 12 is not intended to receive data on the lane(s) 26 on which it is sending downstream data to the peripheral 22. After the time $t_v$ has passed (or elapsed), the host 12 may operate in Mode 2 to transfer downstream data to the peripheral 22 on the reversed lane(s) 26.

The time $t_z$ is effectively the maximum amount of time needed to ensure that the upstream auxiliary link lanes 26 are clear (e.g., for the upstream data on the auxiliary link 24 to either be delivered to the host 12 or to be deemed undeliverable/discarded). Accordingly, by waiting for the time $t_z$ to pass, all upstream data sent by the peripheral 22 will theoretically be received by the host 12 prior to reversing the direction of one or more of the auxiliary link lanes 26, thereby avoiding a situation where the host 12 and the peripheral 22 are attempting to use the same lane 26 to send conflicting data.

Once the time $t_z$ has passed (or elapsed), the host 12 enables the Host TX drivers in step S306, and begins to deliver downstream data according to Mode 2 in step S307 (e.g., step S106 of the embodiment depicted in FIG. 2a).

By waiting for times $t_z$ and $t_v$, the system 10 is able to avoid data contention (e.g., the system 10 is able to avoid a situation in which the peripheral 22 is attempting to send upstream data to the host 12 on the same lane 26 and at the same time that the host 12 is attempting to send downstream data to the peripheral 22), and is able to ensure that the Host TX driver(s) is ready to send data on the reversed lane(s) 26 before the main link manager 17 begins distributing the bytes of the data stream. Accordingly, if the auxiliary link 24 from the peripheral 22 has only one bi-directional lane 26, then no other upstream communication from the peripheral 22 is possible once the system 10 switches to Mode 2.

Further, by using a maximum switch transition time (e.g., the time $t_z$), the system 10 is able to ensure that the lane 26 reverses, or turns around (e.g., the bidirectional lane 26 switches from an upstream lane to a downstream lane, and corresponding ones of the drivers are activated or deactivated). By using the BTS-ACKS handshake protocol, the system 10 is able to enable and disable drivers (such as the Host TX, the Host RX, the Peripheral TX, and/or the Peripheral RX) in a manner to avoid driver contention/data contention. Further, embodiments of the present invention may implement rules that favor downstream behavior should a conflict corresponding to the directions of data traffic arise.

According to embodiments of the present invention, a BTS with just four symbols, or a CRC-verified (cyclic redundancy check verified) packet of four bytes, may be used when there is one auxiliary link lane 26 (e.g., when u=1). According to embodiments of the present invention, the system 10 may use ANSI 8b/10b control symbols (k-codes) for special events, such as BTS, as will be known to one of ordinary skill in the art. Symbols are repeated two, four, or eight times to match the number of lanes in the link, and to improve data integrity. However, the BTS does not need to use control symbols for an 8b/10b encoded bus.

Figure 6:
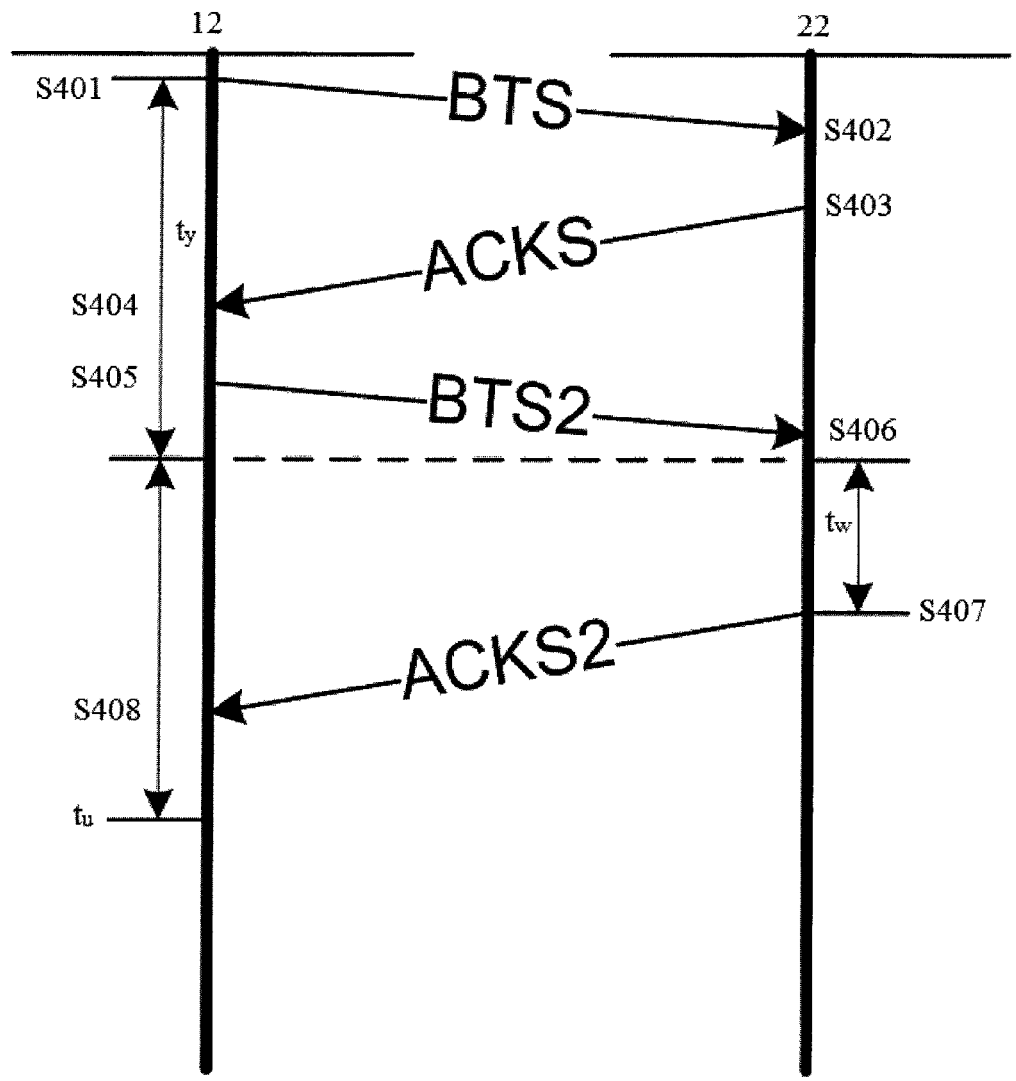
FIG. 6 is a timing diagram depicting a handshake protocol between a host and a peripheral when switching from a second mode to a first mode, according to an embodiment of the present invention.

FIG. 6 is a timing diagram depicting a handshake protocol between a host and a peripheral when switching from a second mode to a first mode, according to an embodiment of the present invention. FIG. 6 depicts a protocol for switching from Mode 2 to Mode 1 as determined by the main link manager 17 (e.g., step S202 of FIG. 2b, or if upstream traffic is needed, or if it is determined that lower bandwidth for downstream traffic would suffice for the data stream).

In initiating the protocol to begin the process of switching from Mode 2 to Mode 1, at step S401, the host 12 sends a BTS on one or more of the downstream lanes 16/26 (e.g., following similar link layer rules or in the same manner as described above with reference to the protocol for switching from Mode 1 to Mode 2, as depicted in FIG. 5).

Once the peripheral 22 receives and detects the BTS sent by the host 12 at step S402, the peripheral 22 will send an ACKS on one or more auxiliary link lanes 26 (if available) to acknowledge that the link can receive downstream data at step S403. In the present embodiment, the peripheral 22 may also send its final sequence of upstream data to the host 12 when sending the ACKS.

If the system 10 is operating isochronously, to support the isochronous links, after sending the BTS in step S401, the host 12 may continue to send Fill characters, or a Fill sequence, in the main link 14 (e.g., in one or more of the d downstream lanes 16) until the ACKS is received by the host 12. The Fill sequence/Fill characters are one or more control symbols or bytes sent downstream in the main link 14 to maintain isochronous clock synchronization before the ACKS is sent by the peripheral 22. While the host 12 is sending Fill characters, the peripheral 22 may ignore the Fill characters for data purposes, but may keep the lanes of the link going/open for the purpose of maintaining lane timing, according to a link layer rule.

Then, once the ACKS is received by the host 12 at step S404, the host 12 (e.g., the main link manager 17) causes the Host TX Drivers to begin to disable/deactivate.

If one or more upstream auxiliary link lanes 26 are being used in the Mode 2 (e.g., if less than all of the auxiliary link lanes 26 are being used to send downstream data from the host 12 to the peripheral 22, leaving one or more auxiliary link lanes 26 available for upstream data to be sent from the peripheral 22 to the host 12), once the peripheral 22 receives and recognizes the BTS at step S402, and sends the ACKS to the host 12 (to acknowledge receipt of the BTS) on one or more of the upstream lanes 26 at step S403 (e.g., according to link layer rules), then the peripheral 22 may receive data while operating in Mode 1.

Further (if one or more upstream lanes 26 are being used in the Mode 2), the host 12 receives the ACKS from the peripheral 22 at step S404, indicating that the auxiliary link 14 is available to receive downstream data. The host 12 then reinitiates high priority downstream data transfer in Mode 1.

If the host 12 fails to receive the ACKS, and because the host 12 expects to receive an ACKS from the peripheral 22 after it sends a BTS to the peripheral 22, once a maximum amount of time $t_u$ required for the Host TX to receive the ACKS has passed (e.g., an amount of time starting when the host 12 sends the BTS at step S401), the host 12 will abort the process of attempting to switch from Mode 2 to Mode 1, but will then retry to initiate the process by resending the BTS on the main link 14 only. However, when sending the BTS the second time, the host 12 will not send the BTS on one of the bidirectional auxiliary link lanes 26 (e.g., to avoid potential data contention). The host 12 will then continue to wait to receive an ACKS from the peripheral 22.

After sending the BTS at step S401 (and after receiving the ACKS at step S404, if one or more of the u upstream lanes 26 are available in the Mode 2), and after an amount of time $t_y$ required to deactivate or disable the Peripheral TX drivers (e.g., an amount of time to ensure that the sending of data downstream on the auxiliary link lanes 26 is ceased), the host 12 sends a BTS2 at step S405. The BTS2 is a second level BTS flag for confirming a subsequent host-based activity is taken after the initial BTS.

Once the peripheral 22 receives and detects/recognizes the BTS2 at step S406, the peripheral 22 enables/activates one or more of the Peripheral TX drivers to allow for upstream data transmission on one or more corresponding auxiliary lanes 26. Once a maximum amount of time $t_w$ required for the peripheral 22 to activate the Peripheral TX drivers has passed (or elapsed), the peripheral 22 sends an ACKS2 on one or more of the upstream lanes 26 at step S407. The ACKS2 is a second level ACKS flag confirming that a subsequent host-based BTS flag (e.g., BTS2) is received by the peripheral 22, and that the peripheral 22 is ready for a new operation mode (e.g., is ready to operate in Mode 1 in the present embodiment, or is ready to operate in a modified Mode 2 having reduced downstream bandwidth). Once the host 12 receives the ACKS2 at step S408, the system 10 resumes, or enters into, Mode 1 operation (e.g., step S306 of FIG. 2*b*).

Although the previous embodiment considers a scenario where one or more upstream lanes 26 are being used to send upstream data while the system 10 operates in the Mode 2, if all lanes 26 are in a downstream orientation, leaving no lanes available to send data upstream from the peripheral 22 to the host 12, and if the peripheral 22 has data to send upstream to the host 12, the pending data may be handled according to various methods.

For example, pending data transferred from the peripheral 22 to the host 12 may be buffered or discarded. Additionally or alternatively, the system 10 may operate such that the host 12 uses all lanes to send downstream data for a period of time (e.g., for a set period of time), and may then revert (e.g., at regular intervals) at least one auxiliary link lane 26, which is normally upstream when in Mode 1, to its native/upstream direction to service upstream data (to give the peripheral 22 an opportunity to periodically send messages to the host 12). This may be done according to system design and inherent data flow behavior (e.g., a video camera operating at 15 fps at low resolution may need servicing on a timely basis, requiring occasional use of an upstream lane). Further, the host 12 may be programmed to perform an operation, such as initiating the protocol to switch from Mode 2 to Mode 1, or to switch one or more auxiliary link lanes 26 to upstream mode to provide upstream bandwidth, depending on the information contained in the upstream data received from the peripheral 22.

Furthermore, if no upstream lanes 26 are available while the system 10 is operating in the Mode 2 (e.g., if all u auxiliary link lanes 26 are being used for downstream data transfer), the peripheral 22 will not send, and the host 12 will not receive, an ACKS after the first BTS is sent by the host 12. Instead, the host 12 will send the BTS at step S401, will deactivate auxiliary TX drivers during a time $t_y$, and will send a second BTS (BTS2 at step S405) on no more than d channels of the main link 14. Then, upon receiving the BTS2 at step S406, the peripheral 22 will enable Peripheral TX drivers and send the ACKS2 (the first ACKS sent by the peripheral 22 in the present scenario). Then, upon receiving the ACKS2 at step S408, and after the time $t_u$ has passed (or elapsed), the host 12 will either resume Mode 1 operation, or will operate in a modified Mode 2 wherein fewer auxiliary link lanes 26 are used for downstream data transfer.

According to embodiments of the present invention, a BTS with a payload or token may be used. The transport layer may define a BTS with a token or payload and a CRC-16 verification to signal. Accordingly, the BTS may determine a specific number of lanes that the peripheral 22 will switch (if more than one upstream lane is available).

Figure 7:
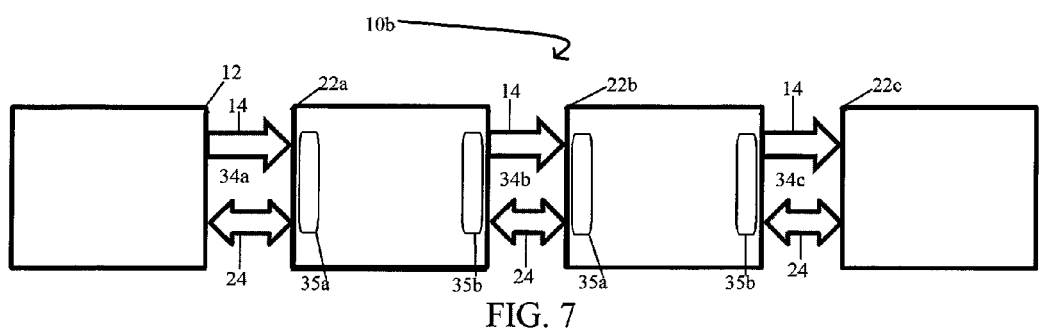
FIG. 7 is a block diagram depicting a main link and an auxiliary link among a host and three peripherals, according to another embodiment of the present invention.

FIG. 7 is a block diagram depicting a main link and an auxiliary link among a host and three peripherals, according to another embodiment of the present invention. Although the previous embodiments of the present invention have depicted a system 10 having a single host 12 and a single peripheral 22, a system 10*b* of another embodiment of the present invention may have a host 12 that may service a number of peripheral devices 22*a*-*c*.

For example, the host 12 may be a desktop computer 12 that services two display monitors 22*a* and 22*b* and a video camera 22*c* as peripheral devices. By using multi stream transporting (MST), the host 12 and various peripheral devices 22*a*-22*c* may be connected by a single first cable 34*a* from the host 12 to a first one of the peripheral devices (e.g., 22*a*), a single second cable 34*b* between the first one of the peripheral devices and a next one of the peripheral devices (e.g., 22*b*), and a single third cable 34*c* between the next one of the peripheral devices and a last one of the peripheral devices (22*c*).

For example, each of the first through third cables 34*a*-*c* between respective ones of the host 12 and the peripheral devices 22*a*-22*c* may be a display port cable.

Each of the middle peripheral devices 22*a* and 22*b* may have two connectors (one connector 35*a* to enable electrical connection to the host 12 or previous peripheral device 22*a*, and one connector 35*b* to enable electrical connection to the next peripheral device 22*b* or 22*c*), while the host 12 and last peripheral device 22*c* may have only one connector (to the first peripheral device 22*a* or to the previous peripheral device 22*b*, respectively). In embodiments of the present invention, each cable 34*a*-*c* may have 4 lanes 16/26, each lane 16/26 having a pair of differential wires.

Accordingly, the system 10*b* of the present embodiment may operate by sending downstream data over the first cable. The downstream data, regardless of which of the peripheral devices 22*a*-22*c* is the intended destination of the downstream data, would not need to be segregated to a particular lane(s) 16 and 26, and a device coupled to the connectors 35*a* and 35*b* in the first display 22*a* would determine what downstream data from the host 12 is intended for the first display 22*a*, and what downstream data is to be sent to the second display 22*b* and/or the camera 22*c*. Accordingly, the device would be able to pass the downstream data intended for the other devices through to the next cable 34*b*, and what downstream data is intended for the first display 22*a*, and therefore does not need to be passed on. A similar device in the second display 22*b* would perform a similar operation to decide what data to pass along to the camera 22*c* via the cable 34*c*.

The system 10 of the present embodiment may operate to identify (e.g., periodically) which of the peripheral devices 22*a*-22*c* are seeking to send upstream data to the host 12, so that the camera 22*c*, for example, can send upstream data communications to the host 12. By turning one of the auxiliary link lanes 26 to an upstream mode, and by using the host 12 to allocate downstream bandwidth, once the camera 22*c* starts sending upstream communication to the host 12, the BTS may dictate the compression rate (or compression ratio) of downstream data from the host 12 to the other devices 22*a* and 22*b*.

Similarly, in a system 10*b* of an embodiment of the present invention having this configuration, if less than all of a group of multiple peripheral devices (e.g., the peripheral devices 22*a*-22*c*) are intended to receive downstream data from the host 12, the BTS can determine which peripheral device 22 in a system of multiple devices is selected to increase efficiency of the operation of the system.

While embodiments of the present invention have been particularly shown and described with reference to exemplary embodiments thereof, it will be understood by those of ordinary skill in the art that various changes in form and details may be made therein without departing from the spirit and scope of the present invention as defined by the following claims, and their equivalents.

What is claimed is:

1. A system capable of bi-directional data transfer, the system comprising:
a host configured to send downstream data to a peripheral and to receive upstream data from the peripheral;
a main link comprising d main link lanes coupled to the host and configured to transfer the downstream data from the host to the peripheral; and
an auxiliary link coupled to the host and comprising u auxiliary link lanes, one of which being a first auxiliary link lane, for transferring the upstream data from the peripheral to the host in a first mode, and for transferring the downstream data from the host to the peripheral in a second mode,
wherein the host is configured to engage in one or more handshake processes with the peripheral to cause the auxiliary link to switch between the first and second modes,
wherein d and u are natural numbers, and
wherein u is greater than one.

2. The system of claim 1, wherein between 1 and u of the auxiliary link lanes are used for transferring the downstream data from the host to the peripheral during the second mode, and
wherein between 0 and (u−1) auxiliary link lanes are used for transferring the upstream data from the peripheral to the host during the second mode.

3. The system of claim 1, wherein the host comprises a graphics processor, and
wherein the peripheral comprises a display device.

4. The system of claim 1, wherein the host is configured to send a first bus turn-around sequence (BTS) flag to the peripheral via one or more main link lanes of the main link during the handshake process for switching from the first mode to the second mode; and
wherein the host is configured to receive a first acknowledge sequence (ACKS) flag from the peripheral via one or more auxiliary link lanes comprising the first auxiliary link lane during the handshake process for switching from the first mode to the second mode.

5. The system of claim 4, wherein the peripheral is configured to:
receive and detect the first BTS flag before sending the first ACKS flag;
terminate transfer of the upstream data on the first auxiliary link lane; and
deactivate a peripheral transmission driver corresponding to the first auxiliary link lane during the handshake process for switching from the first mode to the second mode, and
wherein the host is configured to:
receive the first ACKS flag;
wait for an amount of time to ensure the peripheral transmission driver corresponding to the first auxiliary link lane is deactivated;
enable a host transmission driver corresponding to the first auxiliary link lane; and
send the downstream data to the peripheral on the first auxiliary link lane during the handshake process for switching from the first mode to the second mode.

6. The system of claim 1, wherein, when all auxiliary link lanes of the auxiliary link are in a downstream mode for sending the downstream data from the host to the peripheral in the second mode, the host is configured to:
send a first BTS flag;
disable a host transmission driver corresponding to the auxiliary link;
send a second BTS flag; and
enable a peripheral transmission driver corresponding to the first auxiliary link lane during the handshake process for switching from the second mode to the first mode.

7. The system of claim 6, wherein the host is configured to send fill characters in one or more of main link lanes of the main link after sending the first BTS flag during the handshake process for switching from the second mode to the first mode.

8. The system of claim 6, wherein the peripheral is configured to receive the second BTS flag before enabling the peripheral transmission driver corresponding to the first auxiliary link lane, and to send an ACKS flag on the auxiliary link to the host during the handshake process for switching from the second mode to the first mode.

9. The system of claim 1, wherein, when a second auxiliary link lane of the auxiliary link is configured to send the upstream data from the peripheral to the host in the second mode:
the host is configured to send a first bus turnaround sequence (BTS) flag to the peripheral;
the peripheral is configured to receive and detect the first BTS flag, and to send a first acknowledge sequence (ACKS) flag to the host on the second auxiliary link lane;
the host is configured to receive and detect the first ACKS flag, to disable a host transmission driver corresponding to the first auxiliary link lane, and to send a second BTS flag to the peripheral on one or more main link lanes of the main link;
the peripheral is configured to receive and detect the second BTS flag, to enable a peripheral transmission driver corresponding to the first auxiliary link lane, and to send a second ACKS flag to the host; and
the host is configured to receive and detect the second ACKS flag during the handshake process for switching from the second mode to the first mode.

10. The system of claim 1, wherein, when a second auxiliary link lane of the auxiliary link is configured to send the upstream data from the peripheral to the host in the second mode, the host is configured to:
send a first bus turnaround sequence (BTS) flag to the peripheral,
wait an amount of time to receive a first ACKS flag, which corresponds to the first BTS flag, from the peripheral, and
resend a first BTS flag on only one or more main link lanes of the main link if no ACKS flag is detected by the host, during the handshake process for switching from the second mode to the first mode.

11. The system of claim 1, wherein, when a second auxiliary link lane of the auxiliary link is configured to send the upstream data from the peripheral to the host in the second mode:
the host is configured to send a first bus turnaround sequence (BTS) flag to the peripheral;
the peripheral is configured to receive and detect the first BTS flag, and to send a first acknowledge sequence (ACKS) flag to the host on the second auxiliary link lane; and
the host is configured to receive and detect the first ACKS flag, to disable a host transmission driver corresponding to the first auxiliary link lane, to send a second BTS flag to the peripheral on one or more main link lanes of the main link, to wait an amount of time to receive a second ACKS flag, which corresponds to the second BTS flag, from the peripheral, and to resend a second BTS flag on only one or more main link lanes of the main link if no second ACKS flag is detected by the host, during the handshake process for switching from the second mode to the first mode.

12. The system of claim 1, wherein the auxiliary link comprises a second auxiliary link lane for transferring the upstream data from the peripheral to the host in an upstream mode of the second mode, or for transferring the downstream data from the host to the peripheral in a downstream mode of the second mode, and wherein the host and the peripheral are configured to switch the second auxiliary link lane from the downstream mode to the upstream mode when:

a host link manager of the host determines that there is sufficient downstream bandwidth to send the downstream data from the host to the peripheral without sending the downstream data on the second auxiliary link lane; or the host link manager grants a request from the peripheral for an additional auxiliary link lane for the upstream data.

13. A system capable of bi-directional data transfer, the system comprising a host comprising a host transmission driver for sending downstream data to a peripheral, the host being configured to receive upstream data from the peripheral according to an operation of a peripheral transmission driver;

a main link coupled to the host for transferring the downstream data;

an auxiliary link coupled to the host for transferring the upstream data in a first mode and for transferring the downstream data in a second mode;

a processor; and memory, wherein the memory has stored thereon instructions that, when executed by the processor, causes the processor to switch the auxiliary link from the first mode to the second mode, or to switch the system from the second mode to the first mode, wherein the instructions for switching from the first mode to the second mode comprise a protocol for:

sending a bus turn-around sequence (BTS) flag from the host to the peripheral;

sending an acknowledge sequence (ACKS) flag from the peripheral to the host upon the host detecting the BTS flag;

deactivating the peripheral transmission driver; and activating the host transmission driver corresponding to the auxiliary link to enable the host to send the downstream data on the auxiliary link.

14. The system of claim 13, wherein the instructions cause the system to switch from the first mode to the second mode when bandwidth of the main link is insufficient to send the downstream data from the host to the peripheral.

15. The system of claim 13, wherein the instructions cause the system to switch from the second mode to the first mode when the upstream data from the peripheral to the host is pending, or when the system determines that the main link can provide sufficient bandwidth to send the downstream data without sending the downstream data on the auxiliary link.

16. A system capable of bi-directional data transfer, the system comprising:

a host comprising a host transmission driver, and configured to send downstream data from the host to a peripheral, and to receive upstream data from the peripheral according to a peripheral transmission driver;

a main link coupled to the host for transferring the downstream data; and an auxiliary link coupled to the host for transferring the upstream data in a first mode and for transferring the downstream data in a second mode, wherein, when switching from the first mode to the second mode, the host is configured to send a first bus turn-around sequence (BTS) flag to the peripheral via the main link, wherein, upon receiving and detecting the first BTS flag, the peripheral is configured to send a first acknowledge sequence (ACKS) flag via the auxiliary link to the host, and is configured to deactivate the peripheral transmission driver, and wherein the host is configured to activate the host transmission driver to enable the auxiliary link to transfer the downstream data in the second mode.

* * * * *